Jan. 12, 1932.  M. HUTCHINSON  1,841,032
WOODWORKING MACHINE
Filed July 23, 1930
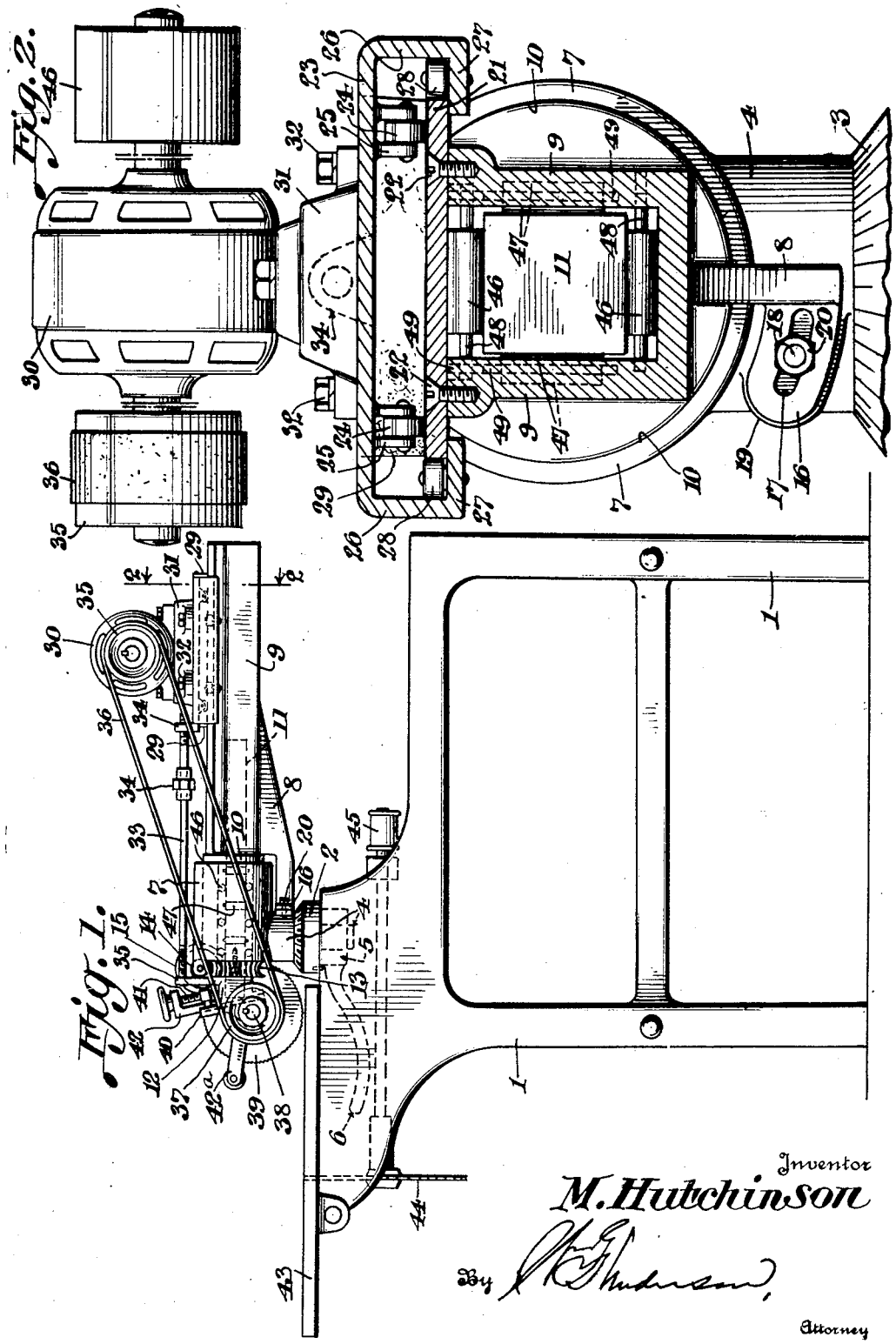
Inventor
M. Hutchinson
By
Attorney Patented Jan. 12, 1932

1,841,032

UNITED STATES PATENT OFFICE

MACKINTOSH HUTCHINSON, OF PHILADELPHIA, PENNSYLVANIA

WOODWORKING MACHINE

Application filed July 23, 1930. Serial No. 470,077.

My invention relates to wood working machines which embody a traveling carriage supporting a drive motor connected with a saw driven from the motor and in which the carriage and saw are moved back and forth relatively to a track by a reciprocating shaft working in a guide-way. In operation of machines of the type mentioned it has been found that when the reciprocating shaft is drawn partially out of its guideway the weight of the head-block and saw carrying elements supported from the end of the shaft causes the shaft to bind with more or less tightness against the wall of the guide-way, as to restrain the free movement of the shaft so that greater manual power must be exerted in reciprocation of the shaft which causes fatigue to the operator as well as impairing the efficient character of the work being done. It has also been observed that such objectionable feature is added to in adjustment of the driving connection between the motor and saw shaft or arbor so that in giving to the driving connection, say, the drive belt, the tautness for the best results the tension between the drive motor and reciprocating shaft tends to deflect the shaft so that it binds against the walls of its guideway with such force that it prevents free reciprocation of the shaft and necessitates giving increased slackness to the belt in order to freely reciprocate the shaft, which slackness in the drive-belt connection lowers the speed of rotation of the saw and otherwise detracts from efficiency of work to be performed. One object of the invention therefore is to provide a construction such as hereinafter described in which the reciprocating shaft is prevented from deflection in its travel and binding against the walls of the guide-way to an extent that would impede the free reciprocation of the shaft with the result of impairing the efficiency of the operation of the machines. It has also for its object to provide for adjusting the tautness of the drive connection between the reciprocating shaft and drive motor hereinafter described, so as to permit adjustment without binding between the reciprocating shaft and its guide-way.

To the accomplishment of the foregoing and such other objects as may hereinafter appear the invention consists in the features hereinafter described and then sought to be defined by the claims reference being had to the accompanying drawings illustrating the preferred embodiment of the invention and in which Figure 1 is a side elevation of a machine embodying the invention;

Figure 2 is an end elevation, partly in section, on an enlarged scale, and looking in the direction of the arrows in Figure 1.

In the drawings the numeral 1 designates a frame of any suitable construction on the top of which is mounted a boss 2 having a scaled face 3. Through the boss and top of the frame passes a rotatable post 4 having a shoulder resting on top of the boss and a reduced threaded portion provided with a nut 5 formed with an arm 6 by which the nut may be tightened to clamp the post in a rotary adjustment thereof for positioning a cross-cut saw to cut the work at the angle desired. The top of post 4 carries a hub 7; and an arm 8, which may be formed integrally with the post, extends laterally therefrom and supports a tubular guideway 9 for a slidable shaft which will have connection with a traveling carriage supporting a suitable drive motor. One end of the guideway 9 is circular in cross section, externally, as shown at 10, so as to fit rotatably in the hub 7 for a purpose hereinafter stated, and within the guide-way 9 is positioned a reciprocating shaft 11, preferably having the same cross-sectional shape of the interior of the guide-way. The outer end of the shaft is threaded or otherwise connected to a head-block 12, and between the head-block and the adjacent end of the hub 7 a worm-wheel 13 is connected to the shaft with which a worm 14 meshes which is operable by a hand-wheel 15 for rocking or turning the guide-way and shaft and cross-cut saw to cut a kerf at an angle to a vertical plane. The arm 8 which carries the guide-way 9 is formed with a flange 16 having an arcuate slot 17 through which passes a bolt 18 extending from a flange 19 that may be cast as a part of post 4 and which will receive a nut 20 so as to clamp and lock the guide-way and associated parts to their adjusted rocking position.

The guide-way 9 supports a track 21 secured thereto by screws 22, or otherwise, and on which travels a carriage 23 provided with rollers 24 journalled in ears 25. The carriage 23 is formed with side-flanges or walls 26 having inturned ends 27 extending beneath the track 21 to hold the carriage to its track, and the inturned ends 27 are provided with rollers 28 positioned to bear against the side edges of the track to aid in holding the carriage to the track and promote the easy travel of the carriage over the track. For the purpose of keeping the track clear of saw-dust and other foreign substances that might clog the travel of the carriage, elastic or resilient wipers 29 are suspended from opposite ends of the carriage, and these wipers together with the side flanges of the carriage serve to house the track and keep it in better condition for travel of the carriage.

The carriage supports an electric or other suitable type of drive motor 30 which may be bolted to a base 31 secured by bolts 32 or otherwise to the carriage 23. The carriage will be moved back and forth over its track by means of a rod 33 connecting it with the reciprocating shaft 11 which slides in the guide-way 9. The rod 33 will be attached at one end to a lug 34 secured to the carriage and at the other end to a bracket 35 extending up from the head-block 12 so that by sliding the shaft of the guide-way the carriage is moved back and forth with it. The rod 33 is formed with right and left hand threads and provided with a turn-buckle or nut 34 so that the rod may be adjusted towards or away from the carriage to vary the distance between the carriage and the point of its connection with the reciprocating shaft of the guide-way and serve as a belt-tightener for the driving connection between the carriage and cross-cut saw arbor. The pulley 35 of the drive motor is shown as connected by a bolt 36 with a pulley 37 on the arbor 38 of a cross-cut saw 39, the saw arbor being journaled in suitable boxes (not shown) carried by a vertically slidable member 40 adapted to be raised and lowered by an adjusting screw 41 working in a bracket 42 and connected with the slidable member 40, the details of which are not shown as they are not claimed herein. The numeral 42ª indicates a suitable handle for moving the reciprocating shaft 11, cross-cut saw, and motor carriage back and forth. The numeral 43 indicates a work-table, pivoted or otherwise attached to the top of the frame 1, and 44 a rip-saw whose shaft is suitably supported by journal bearings and provided with a pulley 45 for connecting with the drive motor shaft, say, by the belt 36, when the supporting arm 8 and guide-way 9 are turned to bring the pulley 3 of the rip-saw shaft and motor into alinement. A counter-weight or fly wheel or pulley 46 is also shown as connected to the motor shaft.

As previously stated, when the reciprocating rod or bar 11 is drawn partially out of its guide-way in the operation of the cross-cut saw the weight of the saw and its associated parts tends to tilt the slidable bar and cause it to grip the walls of its guide-way so that more manual power is required for moving the reciprocating bar, and so also when the driving connection or belt between the motor shaft and cross-cut saw shaft is tightened for placing the saw under proper tension for most efficient work the strain causes the reciprocating bar to grip or bind against the side walls of its guide-way so that proper reciprocation of the parts is materially interfered with. To relieve and prevent the objections mentioned, I provide the upper and lower walls of the guide-way with transversely disposed rollers 46, and also provide the side walls with vertically disposed rollers 47 as illustrated in Figures 1 and 2 of the drawings the axes of one set of rollers being at right angles to the axes of the other set, with the result that the gripping and binding of the reciprocating bar is overcome and materially beneficial results obtained in operation of the machine. The axles 48 of the transversely disposed rollers are journaled in suitable bearings formed for them in the upper and lower portions of the side walls of the guide-way 9, and the upright rollers are set in cavities for them formed in the side walls and the axles 49 of said rollers fitted in suitable bearings formed in the side walls at the top and bottom of the roller cavities, as indicated in dotted lines in Figures 1 and 2. The features as specified have been found to function in a very satisfactory manner and to relieve the reciprocating bar from the weight of the parts moving therewith so as to contribute to the more satisfactory and efficient working of the parts of the machine as a whole.

I have illustrated and described with particularity the preferred details of the several features of the machine but changes may be made therein without departing from the essential features as sought to be defined in the appended claims.

Having described the invention and set forth its merits what I claim is:

1. A woodworking machine comprising a traveling carriage supporting a drive motor, a track including a tubular guide-way on which the carriage travels, and extending substantially throughout the travel of the carriage, a reciprocating bar positioned within the guide-way and carrying a saw at its outer end, a driving connection between the saw-arbor and drive shaft of the motor, means connecting the motor carriage, saw and reciprocating bar for joint reciprocation of the elements, and roller-bearings positioned within the tubular guide-way between the reciprocating bar and walls of the guide-way to guide the bar and prevent side and vertical deflection and binding in its reciprocation.

2. A woodworking machine comprising a traveling carriage supporting a drive motor, a track including a tubular guide-way on which the carriage travels, and extending substantially throughout the travel of the carriage, a reciprocating bar positioned within the guide-way and carrying a saw at its outer end, a driving connection between the saw-arbor and drive shaft of the motor, means connecting the motor carriage, saw and reciprocating bar for joint reciprocation of the connected elements, and roller-bearings positioned within the tubular guide-way between the reciprocating bar and side-walls of the guide-way to guide the bar and prevent its lateral deflection and binding in its reciprocation.

3. A woodworking machine comprising a traveling carriage supporting a drive motor, a track including a tubular guide-way on which the carriage travels, and extending substantially throughout the travel of the carriage, a reciprocating bar positioned within the guide-way and carrying a saw at its outer end, a driving connection between the saw arbor and drive shaft of the motor, means connecting the motor carriage, saw and reciprocating bar for joint reciprocation of the connected elements, said means having provision for adjustment of tension between the motor drive shaft and saw arbor, and roller bearings positioned within the tubular guide-way between the reciprocating bar and walls of the guide-way and positioned to bear against the sides of the reciprocating bar to guide the bar and prevent its deflection and binding against the walls of the guide-way in tensioning the connection between the motor drive shaft and saw arbor.

4. A woodworking machine comprising a post formed with a hub, a track for a traveling carriage supporting a drive motor, said track including a tubular guide-way supported from the post and extending substantially throughout the travel of the carriage and having one end rotatably mounted in said hub, a reciprocating bar positioned within the guide-way and carrying a saw at its outer end, a driving connection between the saw arbor and driving shaft of the motor, means connecting the motor carriage, saw and reciprocating bar for joint reciprocation of the connected elements, means for rotating the guide-way, carriage, motor and saw for the saw to cut a kerf at an angle to a vertical plane, and rollers positioned within the guide-way between its walls and the reciprocating bar and bearing against the sides of the reciprocating bar to guide the bar and prevent its deflection and binding against the walls of the guide-way in different rotary adjustments of the guide-way, carriage, motor and saw.

5. A woodworking machine comprising a saw, a motor, a driving connection between the motor and saw, a track, a traveling carriage supporting the motor and provided with roller supports traversing the track, depending side members to the carriage having inturned portions extending beneath the track to hold the carriage to the track, and rollers supported at the sides of the carriage by the inturned portion in position to bear against opposite edges of the track to guide and prevent lateral displacement of the carriage in its travel over the track.

6. A woodworking machine comprising a traveling carriage supporting a motor, a saw having a driving connection with the motor, the saw, carriage and motor traveling in unison, and a track for the carriage; side members to the carriage extended beneath opposite edges of the track, and wipers depending from opposite ends of the carriage to wipe the track in travel of the carriage over the track, said wipers and depending side members of the carriage serving to house the area between the carriage and track to exclude obstructions from between the carriage and track in the area traversed by the carriage.

7. In a woodworking machine comprising a post formed with a hub, a track for a travelling carriage supporting a drive motor, said track including a channel bar supported from the post and extending substantially throughout the travel of the carriage and having one end rotatably mounted in said hub, a plate secured upon the channel bar and extending beyond the sides of said bar, a reciprocating bar positioned within said channel bar and carrying a saw at one end, a driving connection between the saw arbor and driving shaft of the motor, means connecting the motor carriage, the saw and the reciprocating bar for joint reciprocation of the connected elements, and means for rotating the channel bar, the carriage, the motor and saw to make a kerf at an angle to a vertical plane; rollers positioned within the channel bar between its walls and the reciprocating bar and bearing against the sides of the reciprocating bar to guide the same and prevent its deflection and binding against the walls of the channel bar in different rotary adjustments of the channel bar the carriage, the motor and the saw.

In testimony whereof I affix my signature.

MACKINTOSH HUTCHINSON.